United States Patent
Daware et al.

(10) Patent No.: US 11,525,170 B2
(45) Date of Patent: Dec. 13, 2022

(54) METHOD AND SYSTEM FOR SEPARATION OF RARE EARTH ELEMENTS FROM SECONDARY SOURCES

(71) Applicant: Tata Consultancy Services Limited, Mumbai (IN)

(72) Inventors: Santosh Vasant Daware, Pune (IN); Shally Gupta, Pune (IN); Beena Rai, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 350 days.

(21) Appl. No.: 16/799,884

(22) Filed: Feb. 25, 2020

(65) Prior Publication Data

US 2020/0308670 A1  Oct. 1, 2020

(30) Foreign Application Priority Data

Mar. 29, 2019  (IN) .............................. 201921012446

(51) Int. Cl.
| | | |
|---|---|---|
| C22B 59/00 | (2006.01) | |
| C22B 1/00 | (2006.01) | |
| C22B 1/02 | (2006.01) | |
| C22B 7/00 | (2006.01) | |

(52) U.S. Cl.
CPC .............. *C22B 59/00* (2013.01); *C22B 1/005* (2013.01); *C22B 1/02* (2013.01); *C22B 7/007* (2013.01)

(58) Field of Classification Search
CPC ................................ C22B 59/00; C22B 1/005
USPC ........................................................ 75/347
See application file for complete search history.

(56) References Cited

U.S. PATENT DOCUMENTS

2019/0169710 A1* 6/2019 Seron ...................... C22B 7/007

FOREIGN PATENT DOCUMENTS

| CA | 2955313 | 2/2016 | |
|---|---|---|---|
| CN | 103509952 | 1/2014 | |
| CN | 101817547 | 9/2018 | |
| FR | 3052171 A1 * | 12/2017 | ............... C22B 1/02 |
| JP | 2009249674 A * | 10/2009 | |
| WO | WO-2012/152408 | 11/2012 | |
| WO | WO-2017207947 | 12/2017 | |

* cited by examiner

*Primary Examiner* — Weiping Zhu
(74) *Attorney, Agent, or Firm* — Finnegan, Henderson, Farabow, Garrett & Dunner LLP

(57) ABSTRACT

Recovery of rare earth elements (REEs) from electronic wastes is a promising approach. The existing methods for separation of REE from the secondary sources are not economically viable and scalable. A method and system for separation of rare earth metals from a plurality of secondary sources has been provided. The magnet is obtained from the secondary sources which is then crushed to a coarser size. The powder is then demagnetized by heating and roasted at high temperature to obtain the metal oxides. The metals oxides are then dissolved by acid leaching to obtain leach liquor. Iron is removed from leach liquor by precipitation and separated by filtration. The individual REE is then separated by liquid-liquid extraction. The conditions in liquid-liquid extraction are adjusted such that only desired REE is separated. The extracted REE is then stripped out by acid. The individual rare earth element is then precipitated and dried.

5 Claims, 13 Drawing Sheets

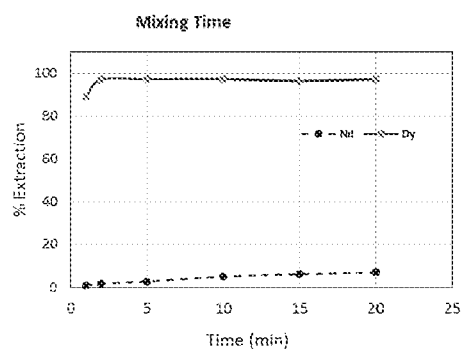 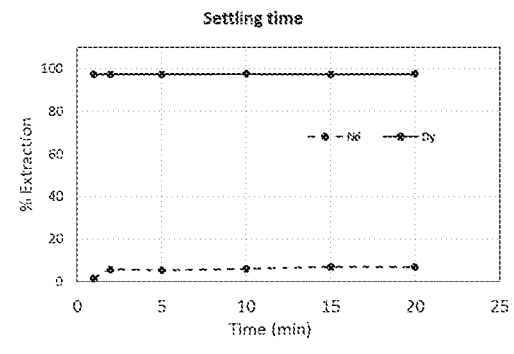
FIG. 12A                    FIG. 12B

METHOD AND SYSTEM FOR SEPARATION OF RARE EARTH ELEMENTS FROM SECONDARY SOURCES

PRIORITY CLAIM

This U.S. patent application claims priority under 35 U.S.C. § 119 to: India Application No. 201921012446, filed on 29 Mar. 2019. The entire contents of the aforementioned application are incorporated herein by reference.

TECHNICAL FIELD

The embodiments herein generally relates to the field of rare earth metal extraction. More particularly, but not specifically, the invention provides a system and method for separation of rare earth metals from a plurality of secondary sources.

BACKGROUND

Rare earth elements (REEs) are a group of 17 elements, which are used in a wide range of applications ranging from permanent magnets (PM) and phosphors to automobile and petroleum refining catalysts. REE can be extracted from mining. Currently, conventional mining processes are the primary source of REEs. More than 90 of the reserves of REE are located in China. Moreover, the primary sources available in India has very low REE and radioactive Thorium in it, which aggravates the problem. To meet an ever increasing demand for REEs and to mitigate any future supply risks, process of recovering REEs from secondary sources must be developed.

In conventional open pit mining, radioactive elements are exposed due to crushing of hard rocks and underground mining is dangerous due to its possibility of tunnel collapsing and land subsidence. Moreover, tremendous toxic fluids, which are used to dissolve the ore bodies, are released affecting the ecosystem as well as human population. There are a number of different metallurgical processes to recover the REEs in scrap PMs at various technology-readiness levels (TRLs). These include hydrogen decripitation, chemical vapor transport, liquid metal extraction hydrometallurgical processing and pyro-metallurgical slag extraction.

Rare earth elements can also be extracted from a plurality of secondary sources such as electronic waste. Huge amount of electronic waste (e-waste) is generated globally, which is currently disposed in landfill creating environmental hazards. Owing to this, recovery of REEs from e-wastes is a promising approach, wherein scrap permanent magnets in e-wastes could be processed to recover REEs. However, economically viable solution has not been developed for the recovery of REEs from scrap PMs.

As the composition of e-waste varies according to the application and most of the hydrometallurgical recycling processes are source specific. Various attempts have been made in literature to establish a recycling process for e-waste but no end-to-end recycling process has been developed for generating pure metal salts from scrap HD magnets.

Owing to the huge amount of electronic waste (e-waste) generated globally, recovery of REEs from e-wastes is a promising approach, wherein scrap permanent magnets in e-wastes could be processed to recover REEs. However, no economically viable solution has yet been developed for the recovery of REEs from scrap permanent magnets.

SUMMARY

Embodiments of the present disclosure present technological improvements as solutions to one or more of the above-mentioned technical problems recognized by the inventors in conventional systems. For example, one embodiment provides a system for separation of rare earth elements from a plurality of secondary sources, the system comprises a crusher, a demagnetization unit, a grounder, a roaster, a leaching unit, a first precipitator, a filter, an extractor, a stripping unit and a second precipitator. The crusher crushes magnets to a coarser size using a grinder, wherein the magnets are obtained from the plurality of secondary sources. The demagnetization unit demagnetizes the crushed magnet by heating at a first predefined temperature for a first predefined time period. The grounder grounds the demagnetized magnet into fine powder. The roaster roasts the fine powder at a second predefined temperature for a second predefined time period to obtain metal oxides. The leaching unit dissolves the metal oxides by acid leaching to obtain leach liquor. The first precipitator removes iron from the leach liquor using precipitation by adjusting a pH value to more than 2 by addition of sodium hydroxide. The filter separates the iron, wherein the filtrate has a mixture of rare earth elements and the iron. The extractor extracts the individual rare earth elements using a liquid-liquid extraction method by optimally adjusting a set of experimental conditions. The stripping unit strips each of the extracted rare earth elements. And finally, the second precipitator precipitates and dries the each of the rare earth elements to obtain as rare earth metal powder.

In another aspect the embodiment here provides a method for separation of rare earth elements from a plurality of secondary sources. Initially, magnets are obtained from the plurality of secondary sources. In the next step, the obtained magnets are crushed to a coarser size using a grinder. The crushed magnet are then demagnetized by heating at a first predefined temperature for a first predefined time period. The demagnetized magnet are then grounded into fine powder. In the next step, the fine powder is roasted at a second predefined temperature for a second predefined time period to obtain metal oxides. Later, the metal oxides are dissolved by acid leaching to obtain leach liquor. In the next step, iron is removed from the leach liquor using precipitation by adjusting a pH value to more than 2 by addition of sodium hydroxide. In the next step, the iron is separated using filtration, wherein the filtrate has a mixture of rare earth elements and the iron. Further, the individual rare earth elements are separated using a liquid-liquid extraction method by optimally adjusting a set of experimental conditions. In the next step, stripping each of the extracted rare earth elements are stripped one by one. And finally, the each of the rare earth elements precipitated and dried to obtain as rare earth metal powder.

In another aspect the embodiment here provides one or more non-transitory machine readable information storage mediums comprising one or more instructions which when executed by one or more hardware processors cause separation of rare earth elements from a plurality of secondary sources. Initially, magnets are obtained from the plurality of secondary sources. In the next step, the obtained magnets are crushed to a coarser size using a grinder. The crushed magnet are then demagnetized by heating at a first predefined temperature for a first predefined time period. The demagnetized magnet are then grounded into fine powder. In the next step, the fine powder is roasted at a second predefined temperature for a second predefined time period to obtain metal oxides. Later, the metal oxides are dissolved by acid leaching to obtain leach liquor. In the next step, iron is removed from the leach liquor using precipitation by adjusting a pH value to more than 2 by addition of sodium hydroxide. In the next step, the iron is separated using filtration, wherein the filtrate has a mixture of rare earth elements and the iron. Further, the individual rare earth elements are separated using a liquid-liquid extraction method by optimally adjusting a set of experimental conditions. In the next step, stripping each of the extracted rare earth elements are stripped one by one. And finally, the each of the rare earth elements precipitated and dried to obtain as rare earth metal powder.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 12A and 12B show graphical representations of the effect of mixing time and settling time on extraction percentage according to an embodiment of the disclosure.

DETAILED DESCRIPTION

Figure 1:
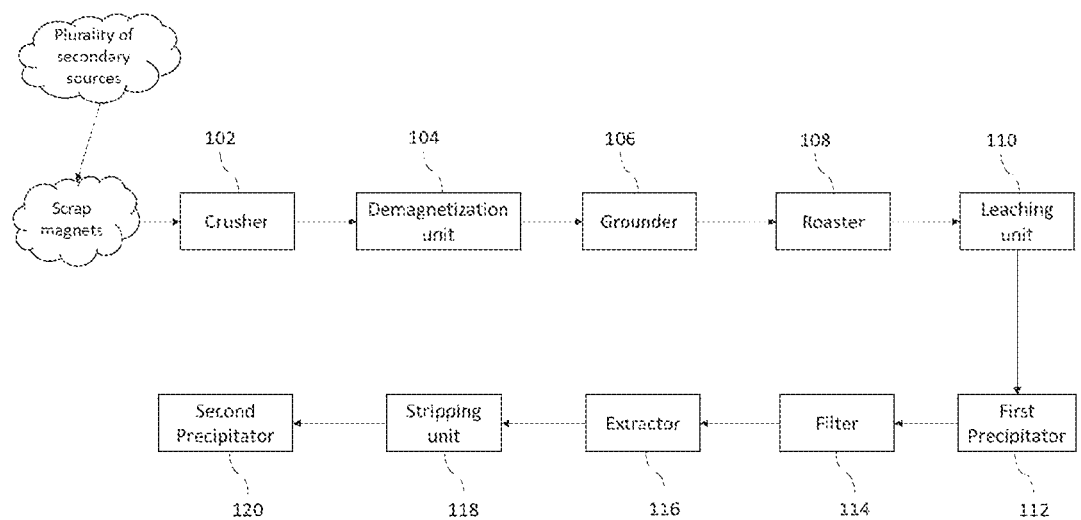
FIG. 1 illustrates a block diagram of a system for separation of rare earth elements from a plurality of secondary sources according to an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through FIG. 12B, where similar reference characters denote corresponding features consistently throughout the figures, there are shown preferred embodiments and these embodiments are described in the context of the following exemplary system and/or method.

According to an embodiment of the disclosure, a system 100 for separation of rare earth elements from a plurality of secondary sources is shown in the block diagram of FIG. 1. The system 100 provides individual rare earth metals with high recovery percentage and high purity. In the present embodiment, the system 100 is used to separate rare earth element Neodymium (Nd) and Dysprosium (Dy) from the plurality of secondary sources. The plurality of secondary sources may include, but not limited to, laptop hard disks, audio systems, wind turbines and MRI machine. The plurality of secondary sources are used to obtain the magnets/scrap magnets which are of no use.

The system 100 comprises a crusher 102, a demagnetization unit 104, a grounder 106, a roaster 108, a leaching unit 110, a first precipitator 112, a filter 114, an extractor 116, a stripping unit 118 and a second precipitator 120. The crusher 102 is configured to crush the magnets to a coarser size using a grinder. The scrap magnets were crushed into small pieces, the nickel coating is removed manually to the possible extent. Further, the demagnetization unit 104 is configured to demagnetize the crushed magnet by heating at a first predefined temperature for a first predefined time period. In an example, the demagnetizing is performed by heating at 350 degree C. for 60 min in a muffle furnace. Though it should be appreciated that the temperature setting and the time period can be varied depending on various other conditions to achieve the optimum output. Demagnetization was done to remove the magnetic effect of the magnets so that the grinding becomes easy otherwise magnets sticks with each other and were difficult to process.

According to an embodiment of the disclosure, the system 100 further comprises the grounder 106 and the roaster 108. The grounder 106 is configured to ground the demagnetized magnet into fine powder. In an example, the fine powder may be of sieve size of 53 to 150 μm. The grounder 106 is using mortar and pestle and mixed by cone and quartering method to achieve uniform mixing. The roaster 108 is configured to roast the fine powder at a second predefined temperature for a second predefined time period to obtain metal oxides. In an example, the second predefined temperature is between 650 and 1000 degree C. and the second predefined time period is about one hour to five hours. Though it should be appreciated that the temperature and time period can be varied depending on the various other experimental conditions. These processes result in the generation of metal oxides.

According to an embodiment of the disclosure, the system 100 further comprises the leaching unit 110. The leaching unit 110 is configured to dissolve the metal oxides by acid leaching to obtain leach liquor. The metal oxides is dissolved by acid leaching having solid to liquid ratio of 10 to 100 g/L, is performed using hydrochloric acid at a leaching temperature set between 27 and 80 degree C. for 1 to 5 hours.

The leaching of all the roasted powdered samples were done in a 250 ml three neck round bottom glass flask, which was kept in an oil bath over a magnetic hotplate cum stirrer. A water condenser was joined to a first neck of the flask for the recycling of leach liquor. The temperature was controlled by feedback from a thermocouple which was inserted in the sample through a second neck. Sample was poured and discharged from a third neck. Preliminary experiments were done at room temperature (300K) to find the time required for complete leaching. For these experiments, the concentrations of the acid solution and the leaching time were varied over a range of 0.1-0.5 M and 1-5 h, respectively. No selectivity and less recovery of Nd and Dy was observed at these conditions so further experiments were done with 1 M of HCl and temperature was varied over a range of 313-353 K. Leached solution was filtered through 40 μm size filter paper to remove the sediment and collect the leach liquor. Sediments were dried at 323K overnight in oven. Further, leaching time study was done for sample C with 1M HCl at 353 K. The experiment was performed for 3.5 h and 5 ml of samples were withdrawn after every 30 min. The effect of acid concentration and pulp density was studied by varying both the parameters over a range of 0.5-1.5M and 10-100 g/L, respectively. The optimum condition was found for maximum recovery and selective leaching of REEs. The concentrations of leach liquors (LL) were measured using ICP-MS. Leaching efficiencies were calculated using the equation (1)

$$\text{Leaching}(\%) = \frac{W_l}{W_m} \times 100 \qquad (1)$$

Here, $W_l$ is the weight of metal leached into acidic solution and $W_m$ is the initial weight of the metal in the roasted magnet samples.

According to an embodiment of the disclosure, the system 100 also comprises the first precipitator 112 and the filter 114. The first precipitator 112 is configured to remove iron from the leach liquor (LL) using precipitation by adjusting a pH value to more than 2 by addition of sodium hydroxide. The filter 114 is configured to separate the iron from the filtrate, wherein the filtrate has a mixture of rare earth elements and the iron.

According to an embodiment of the disclosure, the system 100 further comprises the extractor 116, the stripping unit 118 and the second precipitator 120. The extractor 116 is configured to extract the individual rare earth elements using a liquid-liquid extraction method by optimally adjusting a set of experimental conditions. The extractor 116 is using the two stage liquid-liquid extraction method. The set of experimental conditions comprises using hydrochloric acid (HCl) as acid, using n-Hexane, kerosene or solvent 70 as an organic phase, using Di-(2-ethylhexyl) phosphoric acid (D2EHPA) as extractant, mixing speed is between 100 and 700 rpm, and mixing time is between 1 min and 30 min and residence time is between 1 min and 30 min.

The stripping unit 118 is configured to strip each of the extracted rare earth elements. The second precipitator 120 is configured to precipitate and dry the each of the rare earth elements individually to obtain as rare earth metal powder.

In an example, the extraction were done in batch for 50 ml of leach liquor. D2EHPA was used as an extractant and n-heptane as the diluent. Solution of D2EHPA in n-heptane is termed as organic phase and leach liquor as aqueous phase in further discussion. Aqueous phase and organic phase were mixed and stirred for 5 min at 500 rpm in all the extraction experiments. Aqueous to organic phase ratio (NO) was one in all the experiments. Solutions were poured into separatory funnel and kept for 5 min to separate both the phases. Extraction of Dy and Nd was performed in two sequential steps. 50 ml of leach liquor taken for extraction and 10 ml was withdrawn each time after the both pH adjustments, first stage of extraction and further processed for second stage extraction. In first stage, the pH of the leach liquor was increased to 2 and 0.05M of D2EHPA was used as organic phase. 10 ml of the aqueous phase sample was withdrawn after first stage and the rest of the amount was taken as aqueous phase for the second stage. In second stage, pH was adjusted to 4 and 0.2M of D2EHPA was used as organic phase. Aqueous phase/leach liquor concentration after the extraction of Dy and Nd were measured with ICP-MS. Nd and Dy were stripped using HCl. Effect of acid concentration was on stripping % was studied. For stripping experiment equal volume of acid and extracted organic phase (A/O=1) was taken and stirred at 500 rpm for 30 min.

The extraction equilibrium isotherm was plotted to get the number of theoretical stages required for ~99% extraction of both Nd and Dy. Artificial leach liquor was taken as the feed and the NO was varied from 0.1-3. Number of stages were calculated for both Nd and Dy by performing extraction experiments with two different concentrations of extractant 0.05 and 0.2M, respectively.

Figure 2A:
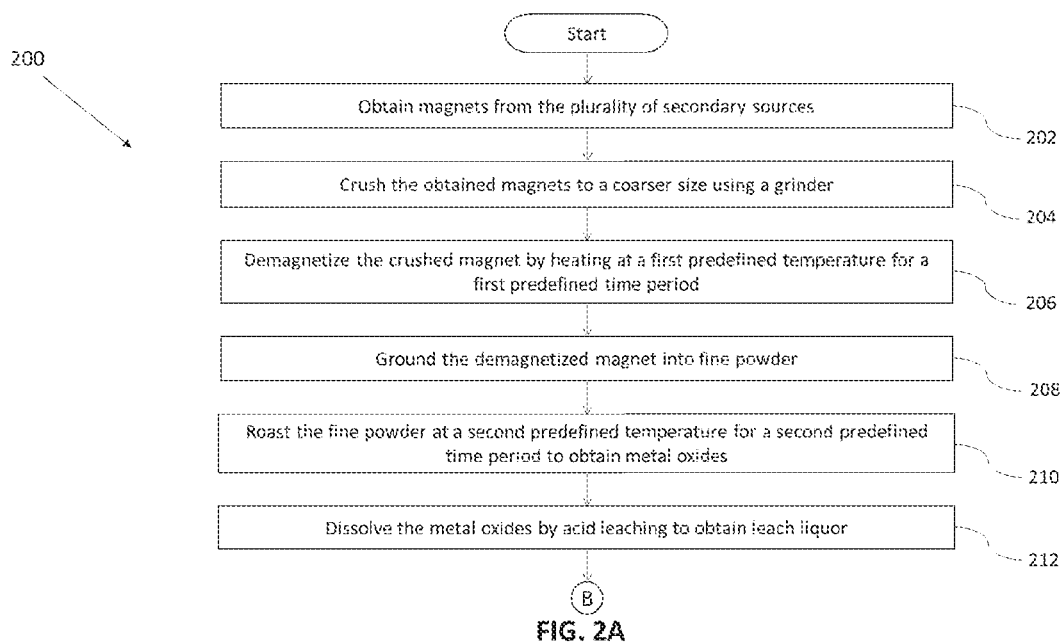
FIG. 2A-2B is a flowchart illustrating the steps involved in separation of rare earth elements from a plurality of secondary sources according to an embodiment of the present disclosure.
Figure 2B:
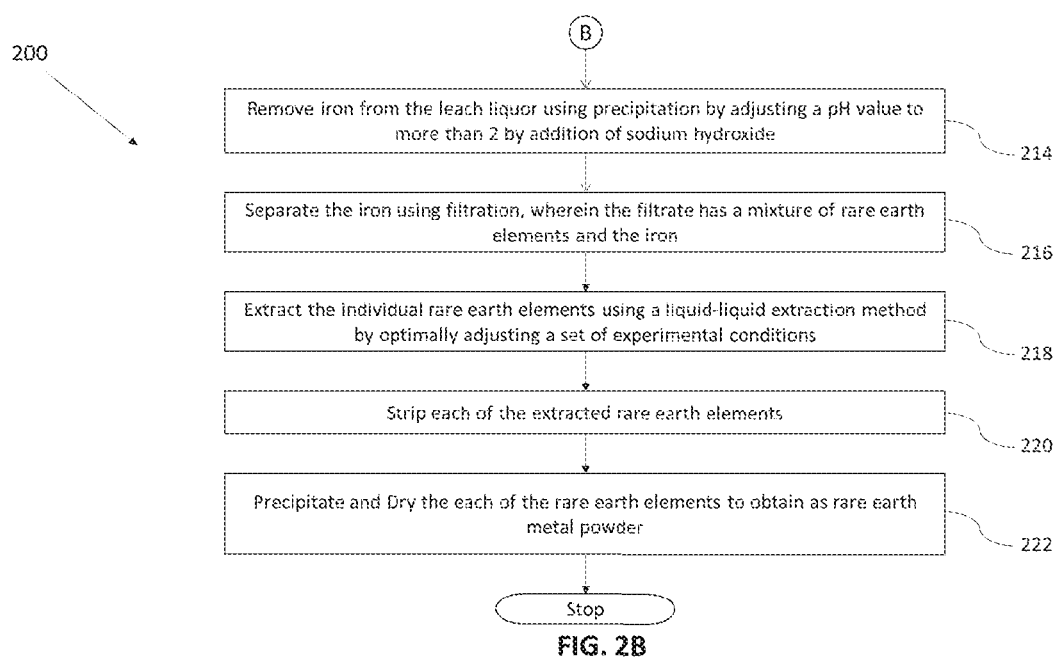

In operation, a flowchart 200 illustrating a method for separation of rare earth elements from the plurality of secondary sources is shown in FIG. 2A-2B. In the present embodiment, the separation method have been specifically used for the separation of Neodymium (Nd) and Dysprosium (Dy). It should be appreciated that the similar method can also be used for the separation of any other rare earth elements, though the experimental conditions may change. Initially at step 202, the scrap magnets are obtained from the plurality of secondary sources. At step 204, the obtained magnets are then crushed to a coarser size using a grinder. At the same time, Nickel coating is also removed to an extent whatever possible.

In the next step 206, the crushed magnet is demagnetized by heating at the first predefined temperature for the first predefined time period. In the present example, the first predefined temperature is about 350 degree C. and the first predefined time period is about one hour. Further at step 208, the demagnetized magnet is grounded into fine powder. The fine powder is of 100-300 sieve size. The grounding is done by using mortar and pestle and mixed by cone and quartering method to achieve uniform mixing.

In the next step 210, the fine powder is roasted at the second predefined temperature for the second predefined time period to obtain metal oxides. The second predefined temperature is between 650 and 1000 degree C. and the second predefined time period is about one hour to five hours. In the next step 212, the metal oxides are dissolved by acid leaching to obtain leach liquor. Further at step 214, iron from the leach liquor is removed using precipitation by adjusting a pH value to more than 2 by addition of sodium hydroxide. At step 216, the iron is separated using filtration, wherein the filtrate has a mixture of rare earth elements and the iron;

In the next step 218, the individual rare earth elements are extracted using a liquid-liquid extraction method by optimally adjusting a set of experimental conditions. At step 220, each of the extracted rare earth elements are stripped.

And finally at step 222, each of the rare earth elements are precipitated individually to obtain as rare earth metal. This is then dried up to obtain the rare earth metal powder.

According to an embodiment of the disclosure, the obtained/separated rare earth element can further be used for recycling in various applications. For example, the recycled Nd and Dy can further be used to make a new magnet.

According to an embodiment of the disclosure, the system 100 can also be explained with the help of experimental findings.

Thermo-Gravimetric Analysis

Figure 3:
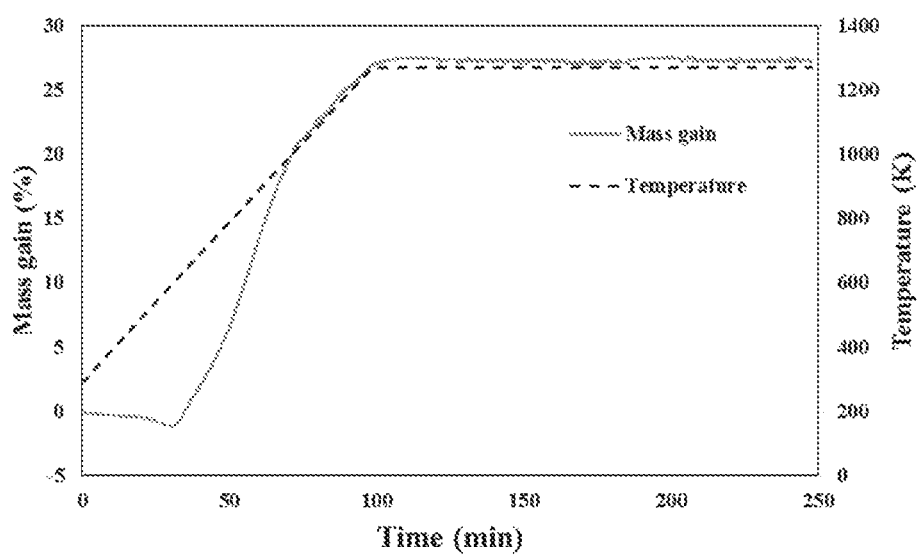
FIG. 3 shows thermo-gravimetric analysis of demagnetized magnet powder according to an embodiment of the disclosure.

A small amount (14.56 mg) of the demagnetized NdFeB magnet powder (<53 to 150 μm) heated up to 1273K at 10 K min-1. Initially, the sample was heated up to 1273 K and then held at this temperature for 150 min. The results of TGA analysis are shown in FIG. 3. Mass gain was low initially and then it sharply increased to attend a constant value of ~28%. The mass gain achieved here is almost equal to the theoretical mass gain 28.9% (measured by the mass balance of composition given in Table 1) which shows that 1273 K temperature is sufficient for the complete oxidation of the magnet powder.

TABLE 1

Compositions of scrap NdFeB magnet and the roasted magnet.

| Composition (wt %) | Fe | Nd | Dy | Oxygen (O) |
|---|---|---|---|---|
| As received sample (wt %) | 63.74 | 33.53 | 1.16 | — |
| After roasting | 49.144 | 27.394 | 0.630 | 21.2 |

Chemical Composition Analysis

The composition of Fe, Nd and Dy in the hard disk magnet and the roasted sample are shown in Table 1. The sum of the compositions shown in table is not equal to 100 because some other elements such as Ni, Co, B and Al are also present in minor amounts. The amount of Fe (63.74%) present in NdFeB is significantly higher than the amount of Nd (33.53%) and Dy (1.16%). The composition changes after roasting due to the presence of oxygen.

Roasting

Demagnetized magnet powder was roasted at 923, 1123, 1223 and 1273 K for 5 h. The demagnetized powder was leached directly (without roasting) with acid for the recovery of REEs. As HD magnets contains a large amount of Fe (as shown in Table 1), considerable amount of Fe was also leached along with Nd and Dy. For the separation of Fe from the leach liquor, Fe was precipitated as $Fe(OH)_3$ using sodium hydroxide (NaOH) which leads into 20-30% loss of Nd and Dy as rare earth elements co-precipitate.

Figure 4:
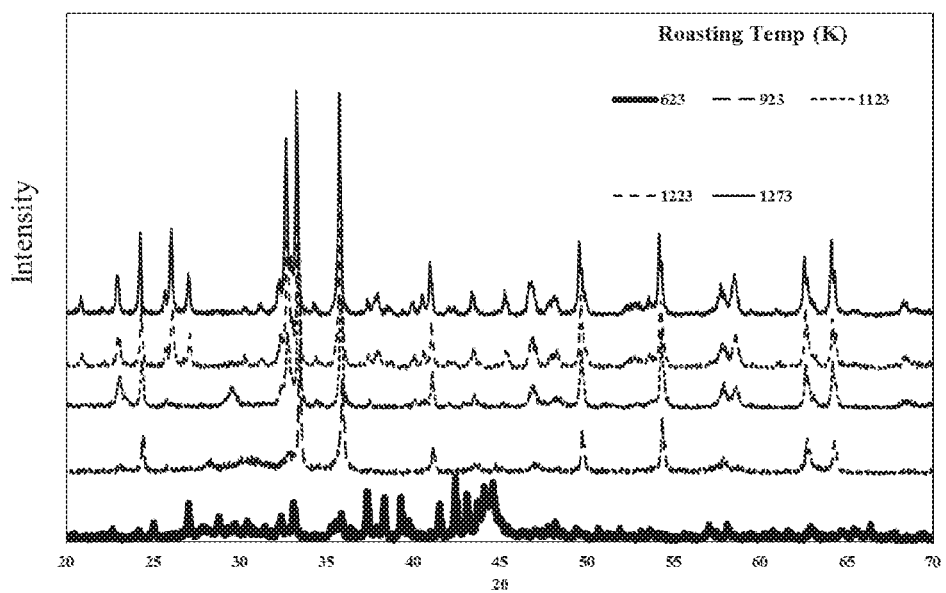
FIG. 4 shows the XRD pattern of roasted magnet powder according to an embodiment of the disclosure.

Since the solubility products ($K_{sp}$) of $Fe(OH)_3$ and $Fe(OH)_2$ are 10-36.51 and 10-14.18, respectively, using standard Gibbs free energy data, which means that the solubility of ferric ion ($Fe^{3+}$) is much lower than that of ferrous ion ($Fe^{2+}$). Demagnetized magnets were roasted at temperatures from 923 to 1273K. X-ray patterns of all the samples are shown in FIG. 4. No peaks of metal-oxides ($Fe_2O_3$, $Dy_2O_3$ and $Nd_2O_3$) were observed in the spectra of raw sample while very small peaks at 28-24°, 33°, 35°, 41°, 50°, 55°, 63°, and 65° were observed in the spectra of the sample A which indicates rhombohedral α-$Fe_2O_3$ structure. As the temperature, increased from 923K to 1273 K intensities of the peaks corresponding to $Fe_2O_3$ increases that means more of Fe is converted into $Fe_2O_3$. Similarly, peaks for $Nd_2O_3$ and $Dy_2O_3$ were observed at 2θ~22.5°, 32°, 40°, 47°, 56° and 69° (JCPDS no-00-041-1089). A small shoulder peak at 2θ~33 was observed in the XRD pattern of the sample C which corresponds to $NdFeO_3$. As the temperature increases from 1223 to 1273 K, the intensity of this peak increases though the intensity of this peak is very less in comparison to other peaks. Leaching experiments were performed to find the optimum roasting temperature and optimum concentration of leaching acid required to get maximum dissolution of Nd and Dy and removal of Fe.

Leaching

Figure 5:
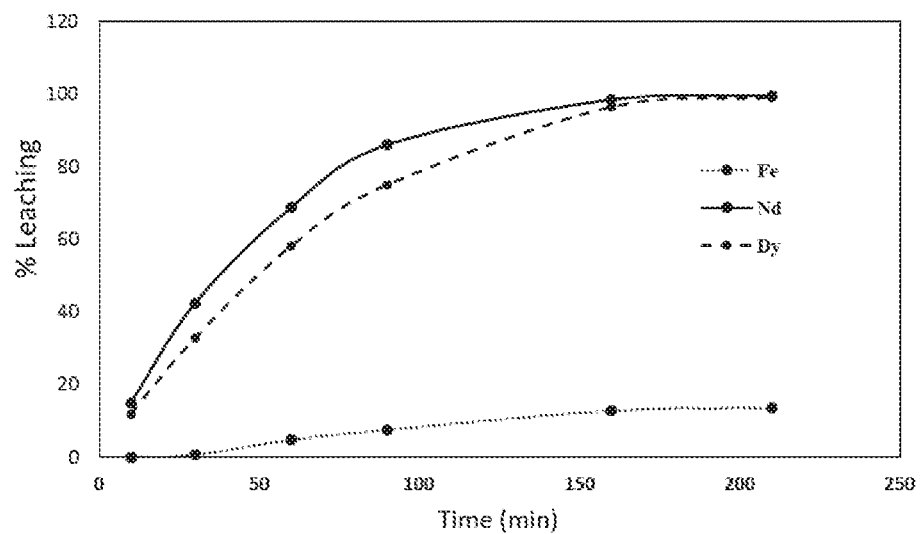
FIG. 5 shows graphical representation of leaching time study for sample C according to an embodiment of the disclosure.
Figure 6:
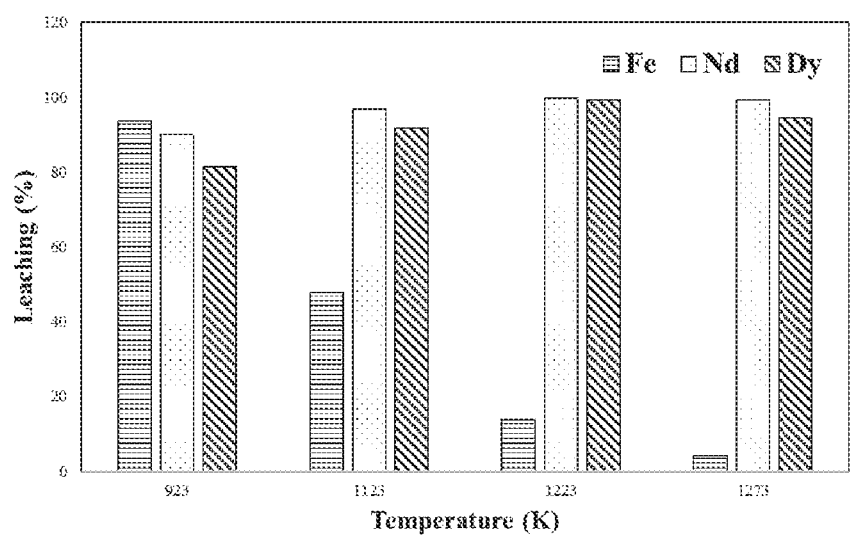
FIG. 6 shows graphical representation of effect of roasting temperature on leaching of Fe, Nd and Dy according to an embodiment of the disclosure.

In order to the study the effect of the roasting temperature on leaching, all the roasted samples (roasted at 923, 1123, 1223 and 1273K) were leached with 1M HCl. The pulp density and leaching time for this study was 10 g/L and 3.5 h (210 min), respectively. Leaching time was determined by performing the kinetic study as shown in FIG. 5, leaching time of 3.5 h (210 min) was sufficient for complete leaching of Nd and Dy. As shown in FIG. 6, no selectivity in leaching was observed for sample A, where more than 90% of Fe, Nd and Dy was leached at 923K. As the temperature increased from 923 to 1273 K, leaching of iron reduced from ~90% to ~10% whereas leaching of Nd increased from ~88% to 100%. Similarly, more than 90% of Dy was leached at 1223 and 1273K. Nd and Dy were selectively leached at 1223 and 1273K. As it was observed in XRD that Fe coverts into $Fe_2O_3$ at high roasting temperatures which does not hydrolyze easily and sediments at the bottom of the leach liquor while Nd and Dy were dissolved into leach liquor. However, some amount of Fe was leached along with Nd and Dy at 1223 K, which was removed by adjusting the pH of leach liquor to 2±0.1. At this pH most of the Fe(III) present in the leach liquor precipitates and then it was separated from the leach liquor through filtration. Final concentration of the leach liquor obtained from sample C was 491 ppm Fe, 274 ppm Nd and 6.1 ppm of Dy. It is also known that Fe(III) forms during the roasting at high temperature does not hydrolyze and precipitates when the pH of the leachate is higher than 2.

Effect of Leaching Temperature

Figure 7:
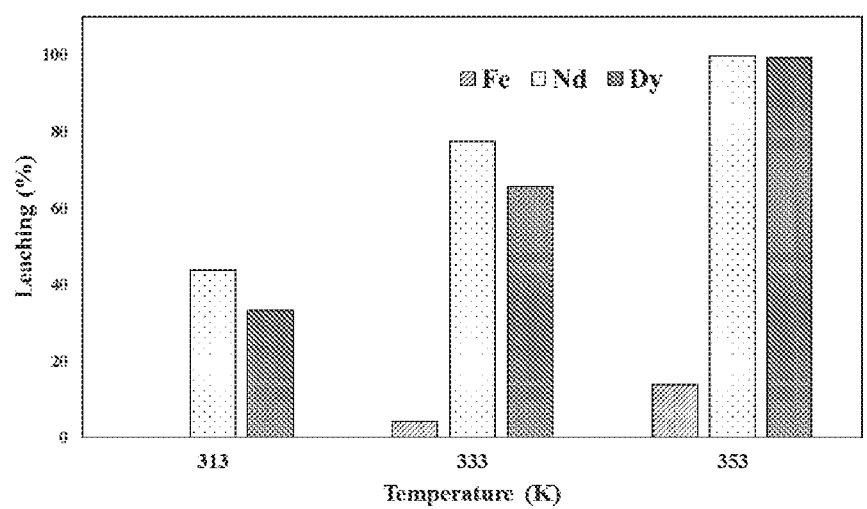
FIG. 7 shows graphical representation of effect of leaching temperature on leaching percentage according to an embodiment of the disclosure.

FIG. 7 shows the effect of leaching temperature on leaching % of Fe, Nd and Dy. Leaching temperature has a positive effect on the recovery of all the metals. No amount of Fe was leached at 313 K which is good for selective leaching but leaching of Nd and Dy is very less at this temperature in comparison to other two temperatures i.e. recoveries of Nd and Dy were low. A high leaching temperature promotes the diffusion of acid to the inner pores of the powder, thereby enhancing the leaching reaction.

Effect of Acid Concentration

Figure 8:
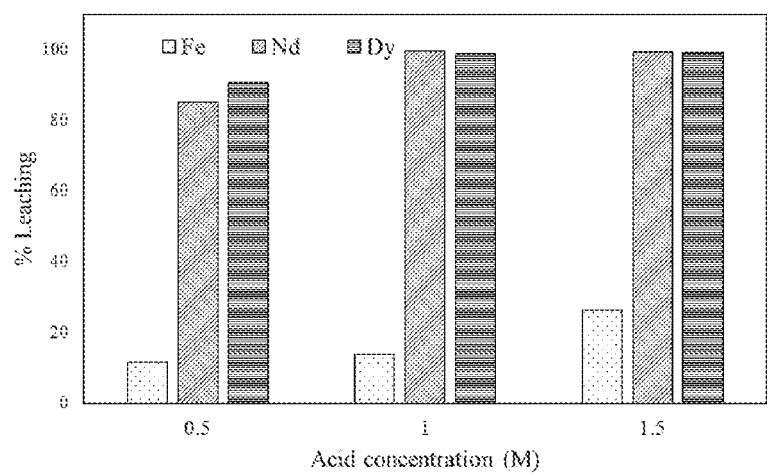
FIG. 8 shows graphical representation of effect of acid concentration on percentage leaching (10 g/L, leaching temperature 353K, roasting temperature 1223 K according to an embodiment of the disclosure.

Effect of acid concentration on leaching of all the elements was studied, where the concentration of HCl was varied over a range of 0.5-1.5M while the pulp density and leaching temperature were kept constant at 10 g/L and 353K, respectively. As the concentration of acid increased from 0.5 to 1.5 M, the leaching of all the elements increased while the selectively towards Nd and Dy was reduced. As shown in FIG. 8, leaching of Fe increased from 15 to 22% when the acid concentration increased from 1 to 1.5M whereas, Nd and Dy were completely leached at both the concentrations. Thus, in the further experiments 1 M of acid concentration was taken as the optimum condition for selective leaching of Nd and Dy.

Effect of Pulp Density

Figure 9:
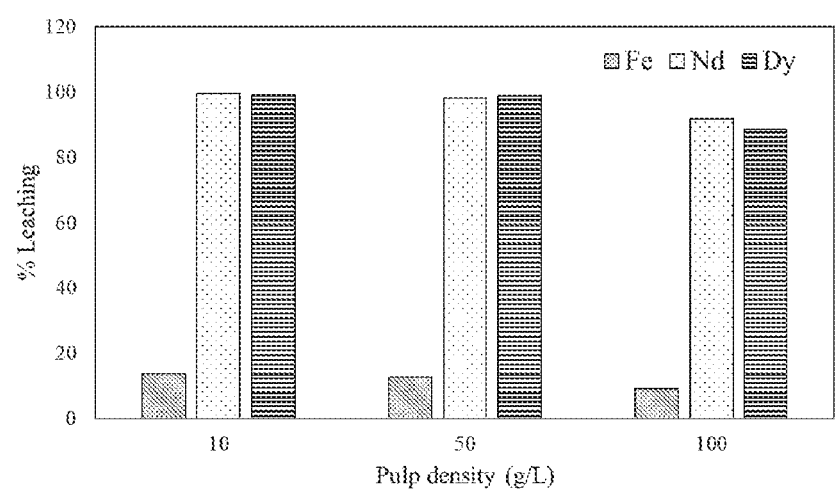
FIG. 9 shows graphical representation of effect of pulp density on percentage leaching (1 M HCl, leaching temperature 353K, roasting temperature 1223 K) according to an embodiment of the disclosure.

Effect of pulp density was studied in a range of 10-100 g/L at an acid concentration and temperature of 1M and 353K, respectively. As shown in FIG. 9, there was no significant change in the leaching of Fe, Nd and Dy when the pulp density increased from 10 to 50 g/L whereas, overall leaching slightly reduced at 100 g/L. Leaching of Fe significantly reduced which is good for selectivity but at the same point leaching of Nd and Dy was also slightly reduced from 100 to 90%, resulting in the loss of recovery of Nd and Dy. The decrease in the leaching efficiency of Nd and Dy with increase in pulp density was attributed to lesser dissolution of metal due to less availability of solid mass surface area towards the leachant.

Two-Stage Extraction

Figure 10A:
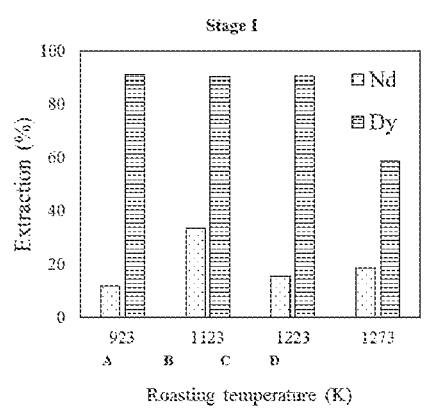
FIGS. 10A and 10B show graphical representations of the effect of roasting temperature on two stage selective extraction of Dy and Nd according to an embodiment of the disclosure.
Figure 10B:
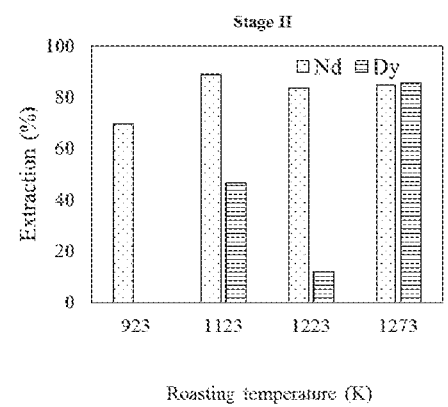

The leach liquor obtained from the leaching of all the samples A, B, C and D were taken for solvent extraction. A two-stage extraction process have been developed for the separation of Nd and Dy. The results of the two-stage extraction are shown in FIG. 10, i.e., in FIG. 10A and FIG. 10B. In first stage, for samples A, B and C, ~90% of Dy was extracted to the organic phase at starving dose of D2EHPA ~0.05M whereas extraction of Nd is ~15% except sample B. In second stage ~80% of the Nd was extracted and Dy was also extracted. Here the important point to notice is that complete Dy is extracted in first stage, % extraction in sample D is depicted as higher as only small amount of Dy is present before second stage of extraction which is almost completely extracted. Selective separation of Nd and Dy is achieved for sample C, in first stage most of Dy was extracted and in second stage Nd was extracted. The reason behind the more selectivity of D2EHPA towards Dy than Nd is the differential stabilization of Dy3+-D2EHPA and Nd3+-D2EHPA complexes in the aqueous and organic phases which results in a larger logPorg/aq value of 34.50 for the Dy3+-D2EPHA complex, compared to a value of 26.49 for the Nd3+-D2EHPA complex. Thus, although D2EHPA binds to both Nd3+ and Dy3+ ions, the selectivity towards Dy3+ is driven by the larger differential stabilization of the Dy3+-D2EPHA complex, which originates from a more 'compact' structure of the complex.

Effect of Mixing Speed on Extraction

Figure 11A:
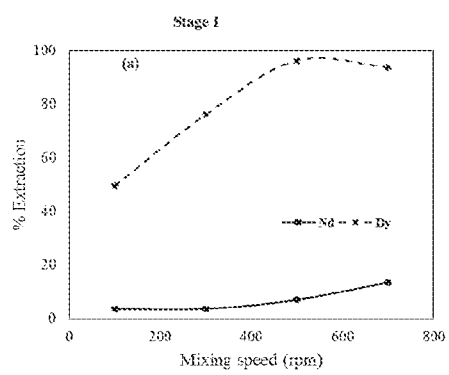
FIGS. 11A and 11B show graphical representations of the effect of mixing speed on extraction of Nd and Dy in stage 1 and stage 2 according to an embodiment of the disclosure.
Figure 11B:
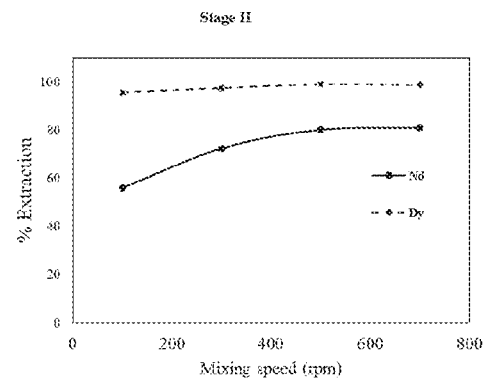

The mixing speed during the extraction process is another important factor to determine the extraction of substances. It is also important to optimize mixing speed to minimize operational cost in scale up of the process. The effect of the mixing speed on extraction of Nd and Dy in both the stages is shown in FIG. 11, i.e. in FIG. 11A and FIG. 11B. It was observed from FIG. 11, that increase in the extraction of Dy and Nd was sharp till 500 rpm after. After that, changes in the percentage of Dy and Nd extraction were not sharp and a plateau was observed at 700 rpm. In general, it is observed that the extraction percentage increased with increasing in mixing speed due to the large interfacial surface area between aqueous and organic phase and mixing promotes the mass transfer. Effect of mixing time and settling time on % extraction is studied. As shown in FIG. 12, i.e., FIG. 12A and FIG. 12B, the mixing time and resident time of 5 min is sufficient for highest extraction of Dy.

Effect of Acid Concentration on Stripping

Nd and Dy were stripped to aqueous phase by using HCl. Concentration of HCl was varied between the range of 0.5 M to 5M. As shown in Table 2, 0.5 M HCl was sufficient to strip out almost all the Nd from organic phase to aqueous phase and at 5M concentration of HCl 92.44% of Dy was stripped.

| HCl Conc. (M) | Stripping % | |
|---|---|---|
| | Nd | Dy |
| 0.5 | 50.12 | 95.23 |
| 2.5 | 54.93 | 97.63 |
| 5 | 92.44 | 99.08 |

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A method (200) for separation of rare earth elements from a plurality of secondary sources, the method comprising:
    obtaining magnets from the plurality of secondary sources (202);
    crushing, by a crusher (102), the obtained magnets to a coarser size using a grinder (204);
    demagnetizing, by a demagnetization unit (104), the crushed magnet by heating at a first predefined temperature for a first predefined time period (206), wherein the first predefined temperature is 350 degree C. and the first predefined time period is one hour;
    grounding by a grounder (106) the demagnetized magnet into fine powder (208);

roasting by a roaster (108) the fine powder at a second predefined temperature for a second predefined time period to obtain metal oxides (210), and the second predefined temperature is between 650 to 1000 degree C., and the second predefined time period is between one hour to five hours;

dissolving the metal oxides by a leaching unit (110) by an acid leaching to obtain leach liquor (212), wherein hydrochloric acid is used for leaching;

removing iron from the leach liquor using precipitation by a first precipitator (112) by adjusting a pH value to more than 2 by addition of sodium hydroxide (214);

separating the iron using filtration by a filter (114) to obtain a filtered leach liquor, wherein the filtered leach liquor has a mixture of rare earth elements(216);

extracting an individual rare earth element using a liquid-liquid extraction method by an extractor (116) by optimally adjusting a set of experimental conditions (218), wherein the liquid-liquid extraction is performed by using the filtered leach liquor as an aqueous phase and an extractant in an organic solvent as an organic phase for extraction of the individual rare earth element, wherein the rare earth elements are Neodymium (Nd) and Dysprosium (Dy), the liquid-liquid extraction is performed by mixing the aqueous phase and the organic phase and stirring the mixture of the aqueous phase and the organic phase at a predetermined temperature for predefined mixing speed for predefined mixing time, wherein the liquid-liquid extraction is a two stage liquid-liquid extraction, and wherein the two stage liquid-liquid extraction process enables selective separation of Neodymium (Nd) and Dysprosium (Dy), wherein the set of experimental conditions in the two stage liquid-liquid extraction comprises:

using the hydrochloric acid as the acid in the aqueous phase, using one of n-Hexane, kerosene and solvent 70 as the organic phase, using Di-(2-ethylhexyl) phosphoric acid (D2EHPA) as the extractant, the mixing speed is between 100 and 700 rpm, the mixing time of between 1 min to 30 mins and residence time is between 1 min to 30 mins, a selectivity of extractant in two stage liquid-liquid extraction is based on differential stabilization complexes in the aqueous phase and organic phases, a selective separation of Nd and Dy is achieved by extracting Dy in the first stage and extracting Nd in the second stage of the two stage liquid-liquid extraction, a selectivity of the extractant D2EHPA is more towards Dy than Nd is due to the differential stabilization of Dy3+-D2EHPA and Nd3+-D2EHPA complexes in the aqueous and organic phases, in the first stage, the pH of the aqueous phase is increased to 2 and 0.05 M of D2EHPA is used as the organic phase, and in the second stage, pH of the aqueous phase is adjusted to 4 and 0.2 M of D2EHPA is used as the organic phase;

stripping each of the Neodymium (Nd) and Dysprosium (Dy) by a stripping unit (118); and precipitating and drying the each of Neodymium (Nd) and Dysprosium (Dy) by a second precipitator (120) to obtain Neodymium (Nd) and Dysprosium (Dy) as powder (222).

2. The method of claim 1, wherein the fine powder is of 100-300 sieve size.

3. The method of claim 1, wherein the plurality of secondary resources comprises laptop hard discs, audio systems, wind turbines, and MRI machine.

4. The method of claim 1, wherein the step of dissolving comprises acid leaching by a metal oxide to acid ratio of 10 to 100 g/L, at a leaching temperature set between 27 to 80 degree C. for 1 to 5 hours.

5. The method of claim 1 further comprising the step of making a new magnet using the Neodymium (Nd) and Dysprosium (Dy) powder.

* * * * *